United States Patent

[11] 3,547,239

| [72] | Inventor | Georg Titt<br>Furstenfeldbruck-Buchenau, Germany |
|---|---|---|
| [21] | Appl. No. | 757,693 |
| [22] | Filed | Sept. 5, 1968 |
| [45] | Patented | Dec. 15, 1970 |
| [73] | Assignee | Fa. George Muller Kugellagerfabrik<br>Nurnberg, Germany |
| [32] | Priority | March 14, 1968 |
| [33] | | Germany |
| [31] | | No. 1,650,787 |

[54] ONE-WAY ENGAGING CLUTCH HAVING WEDGING BLOCKS
40 Claims, 20 Drawing Figs.

[52] U.S. Cl. .................................................. 192/45.1
[51] Int. Cl. ................................................... F16d 41/07
[50] Field of Search ...................................... 192/41(.3), 45.1; 188/82.8

[56] References Cited
UNITED STATES PATENTS

| 2,614,669 | 10/1952 | Dodge ........................... | 192/45.1 |
| 2,881,886 | 4/1959 | Troendly et al .............. | 192/45.1 |
| 3,036,678 | 5/1962 | Dodge ........................... | 192/45.1 |

Primary Examiner—Allan D. Herrmann
Attorney—Steinberg & Blake

ABSTRACT: A one-way engaging clutch for transmitting rotary movement from a driving unit which rotates in opposed directions to a driven unit which is to be rotated in only one direction. This clutch includes an inner race having an outer circumferential surface and an outer race having an inner circumferential surface coaxially surrounding and spaced from the outer circumferential surface of the inner race. Between these circumferential surfaces of the races there are a series of wedging blocks circumferentially distributed along these circumferential surfaces and each having a pair of opposed side surfaces one of which is formed with a radially extending recess and the other of which is formed with a radially extending outwardly bulging portion circumferentially aligned with the latter recess. The series of wedging blocks are arranged in an at least partly nesting relation where the outwardly bulging portions of the blocks are respectively received in the recesses of adjoining blocks. In this way it is possible to situate an extremely large number of blocks about the common axis of the races to provide a large area of wedging engagement between the blocks and races.

PATENTED DEC 15 1970 3,547,239
PRIOR ART Fig. 1
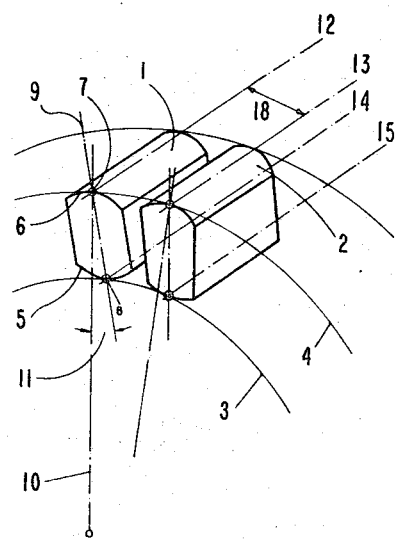
Fig. 2
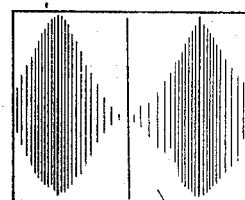
Fig. 3
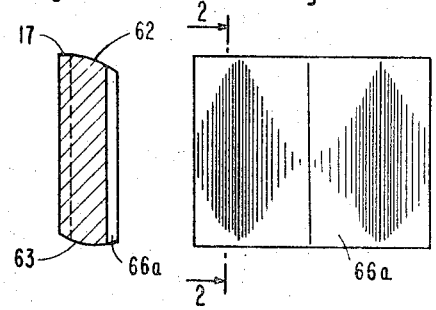
Fig. 4
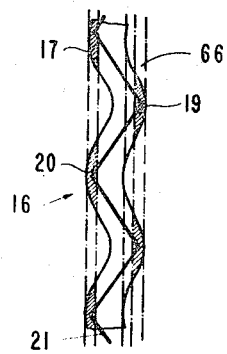
Fig. 5
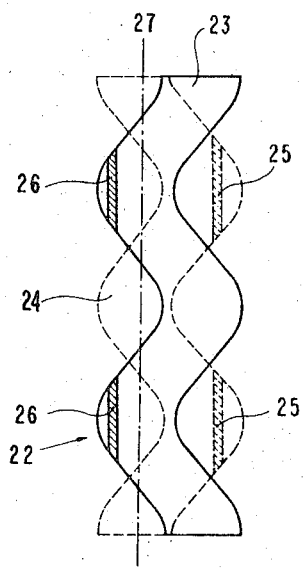
Fig. 6
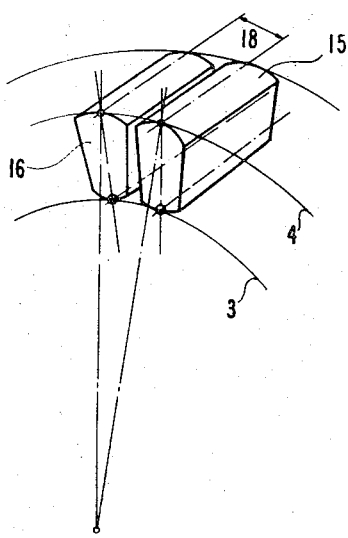
Fig. 7
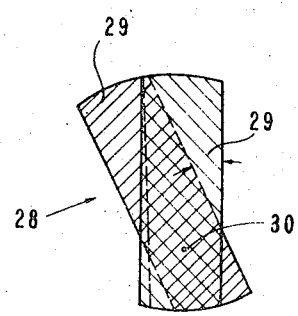
INVENTOR.
GEORG TITT
BY Sternberg & Blake
attys

PATENTED DEC 15 1970

INVENTOR.
GEORG TITT
BY Steinberg & Blake
attys

3,547,239

ONE-WAY ENGAGING CLUTCH HAVING WEDGING BLOCKS

BACKGROUND OF THE INVENTION

The present invention relates to clutches.

In particular, the present invention relates to overrunning or one-way engaging clutches which include between concentric inner and outer races tiltable sprags or wedging blocks capable of being tilted to engage and disengage the clutch.

Conventional clutches of this general type suffer from the drawback of requiring structures of considerable size in order to transmit a relatively large amount of driving power. One of the primary reasons for this latter disadvantage resides in the fact that the wedging blocks between the races of the clutch are necessarily spaced with the difficult structures at considerable circumferential distances apart from each other, so that the extent of wedging engagement which can be provided through the blocks between the inner and outer races of the clutch is limited. Also, in conventional clutches of this type the pressure forces at the wedging engagement between the blocks and the races are not distributed in the most desirable manner, since with conventional structures it is unavoidable that there will be localized areas where the pressure force is considerably higher than at other areas, thus inducing large stresses at localized areas. Furthermore, with conventional clutches it is difficult to achieve, particularly in an automatic manner, an operating condition of the clutch which will correspond to the particular transmission conditions which are encountered in the drive transmission.

SUMMARY OF THE INVENTION

It is accordingly a primary object of the present invention to provide a clutch of the above type which will avoid the above drawbacks.

In particular, it is an object of the present invention to provide a clutch of the above type which is capable of accommodating in the circumferential space between the inner and outer clutch races a number of wedging blocks far in excess of that which heretofore could be accommodated in such a space.

Therefore, it is an object of the present invention to provide a clutch which when compared to a conventional clutch of the same size is capable of transmitting a turning moment considerably greater than that which can be transmitted by a conventional clutch of the same size.

Also, it s an object of the present invention to provide a clutch of the above type which when required to transmit a given turning moment can be made of a smaller size than a conventional clutch which will transmit the same turning moment.

Thus, it is an object of the invention to provide a clutch structure of the above type which is capable of achieving great economies of space and weight, as compared to conventional clutch structures.

It is also an object of the present invention to provide a clutch structure of the above general type which will undergo very little wear during its operation so that it will have a long life of reliable use.

In addition, it is an object of the present invention to provide a clutch of the above type whose components can be maintained reliably lubricated at all times.

Furthermore, it is an object of the invention to provide a clutch of the above general type which can be widely used in a number of sharply different types of installations.

Furthermore, it is an object of the present invention to provide a clutch structure which can be very efficiently switched between engaged and disengaged positions even at relatively high frequency.

With the structure of the invention the clutch has an inner race provided with an outer circumferential surface and an outer race provided with an inner circumferential surface coaxially surrounding and spaced from the outer circumferential surface of the inner race. A plurality of wedging blocks are distributed along the circumferential space between these circumferential surfaces of the races, and according to one of the features of the invention each wedging block has at one of its side surfaces a substantially radially extending recess and at its opposed side surface a substantially radially extending outwardly bulging portion projecting circumferentially into the side recess of an adjoining wedging block, so that the wedging blocks of the clutch of the invention are capable of having an internested relationship where the circumferentially bulging side portions of the blocks are respectively received in the recesses of adjoining blocks.

These recesses and bulging portions of the blocks are made in such a way that at least one of the axially extending end faces of each block, which engages one of the races at its circumferential surface, is of a wavy configuration. Such an end surface of wavy configuration has the waves thereof extending circumferentially with respect to the common axis of the races. It is particularly preferred, however, to provide both of the axially extending opposed end surfaces of the blocks, which respectively have wedging engagement with the races, with a wavy configuration. In this case, the wavy configurations of the opposed axially extending end surfaces can respectively form parts of waves of the same amplitude or of different amplitudes. The same is true for the wave lengths of the wave-shaped axially extending end surfaces of the wedging blocks of the invention. These wave lengths can have different lengths, respectively. It is also possible, according to the invention, to provide a block structure where the waves formed by the opposed axially extending end surfaces of each block are out of phase preferably to an extent equal to one half a wavelength.

A further feature contributing to the results of the invention resides in providing the wedging blocks each with a configuration which when projected onto a plane normal to the common axis of the races is primarily in the shape of a wedge which gradually increase in width outwardly from the inner race toward the outer race. Such a block will have at its outer axially extending end surface which engages the outer race a circumferential dimension greater than the corresponding dimension at the inner axially extending end face which coacts with the inner race.

In order to provide a wedging block having the above features, the block may have in successive radial planes distributed along the common axis of the races rectangular sections having their longer sides extending substantially radially between the races and their shorter sides extending substantially circumferentially with respect to the common axis of the races, and these successive, axially distributed rectangular block sections are angularly displaced one with respect to the next about an axis parallel to the common axis of the races in such a way that the axially extending end surfaces of each block which have wedging engagement with the races are of a wavy configuration.

According to a particularly preferred construction of the invention the wavy axially extending outer end surface of each wedging block forms part of a wave whose amplitude is far greater than the amplitude of the wave formed by the axially extending wave-shaped surface of the block which engages the inner race. With such a construction, the wave length of both axially extending end surfaces are equal but are out of phase by the extent of one half a wave length. The resulting block structure of the invention provides not only the advantage of an internesting relationship between the blocks so that a large number thereof may be situated in a given circumferential space between the races, but in addition in a radial plane passing perpendicularly through the common axis of the races each block has an at least approximately wedge-shaped configuration with the width of each block gradually increasing from the inner toward the outer race, so that by reason of this latter factor also the extent to which the circumferential space between the races can be filled with blocks is increased.

The different amplitudes for the waves formed by the wavy-shaped axially extending end faces of each block are achieved by angularly displacing successive axially distributed radial sections of each block about a twist axis which is parallel to the common axis of the races and situated midway between the side edges of each radial section at a distance of approximately one third of the way from the inner toward the outer race.

With the structure of the invention the outer axially extending end face of each block which coacts with the outer race is designed in such a way that when it has full wedging engagement with the outer race under full load, the axially extending wedging area between each block and the outer race is interrupted since in this way it is possible to achieve equal inner and outer wedging areas to provide at the inner wedging area the greatest rolling pressure. Use may be made of this circumstance to provide the outer axially extending surface of each block with a wedging area which is reduced to such an extent that an equal rolling pressure is provided at the outer axially extending end surface of each block.

A particularly reliable operation of a clutch of the above type is achieved if, according to a further feature of the invention, the axially extending end surfaces of each block are circumferentially curved along logarithmic spirals. As a result of this feature the angles of engagement between each block and the races are always equal irrespective of deviations of the concentric circumferential surfaces of the races from precisely exact circular configurations for any reason.

A further feature of the invention resides in providing the radial end faces of each wedging block with hooks for engaging an annular spring. The cross-sectional configuration of these hooks is such that when the blocks tilt beyond the clamping position during movement from the engaged to the disengaged position, the annular spring exerts on the block a greater force than when the blocks are in their wedging positions. Moreover, these hooks are arranged so as to be displaced from the clamping axis outwardly toward the outer race. In this way also it is possible to achieve an extremely high switching frequency of the clutch between engaged and disengaged positions even under undesirable operating conditions where the blocks have been displaced beyond their wedging positions.

It is fundamentally immaterial whether the wedging blocks of the invention are situated with their smaller wedging surfaces directed toward the inner race or in a reversed position where they are turned through 180° with their smaller wedging surfaces directed toward the outer race. In this latter event, the only factor which need be taken into consideration is that for the turning moment which can be satisfactorily transmitted a smaller value must be chosen.

Thus, if the wedging blocks of the invention are arranged with their smaller wedging areas directed outwardly toward the outer race, then instead of using an annular spring which is under tension, a spring which is under compression is used, so that the wedging blocks are pressed toward the outer race of clutch.

The clutch of the invention furthermore is provided with a device actuated by centrifugal force to achieve an operation where the wedging blocks even in their disengaged positions will rotate together with the inner race and are reliably held spaced from the outer race, so that the device of the invention will operate with absolutely no wear. For this purpose, the structure of the invention includes at least one end of each wedging block a pair of cages which are circumferentially turnable with respect to each other in opposed directions and which are urged to turn with respect to each other by an annular spring when the pulling force of the spring, as a result of the action of centrifugal force on a flyweight, is released through swinging of a lever which carries the flyweight.

However, it is also possible to provide the cages with turbine blades and to adjust the cages with oil pressure. The action of such turbine blades is proportional to the centrifugal force at the wedging blocks. Also, the displacement of the wedging blocks away from one of the races can be brought about directly through bladelike extensions on the wedging blocks themselves without requiring a second cage for this purpose.

Thus, it is possible to achieve with the present invention a number of advantages. Because of the relatively small weight of the wedging blocks and the resulting relatively small spring forces required to act on the blocks, the formation of a film of lubricant is not restricted even where the blocks remain in engagement with that one of the races which changes its direction of rotation. As a result, the operating life of the clutch of the invention is considerably increased and can be brought to a value which is encountered in the case of simple gears or the like.

In addition, the drag or friction moment is far more favorable with the structure of the invention as compared to known clutches and is only on the order of one tenth of the friction moment of conventional clutches.

The precise, almost completely slip-free switching of the clutch between engaged and disengaged positions makes it possible to achieve extremely short switching durations with the added possibility of high switching frequencies.

The wedging blocks of the invention can be constructed in such a way that a given structure of wedging block is suitable not only for a predetermined shaft diameter but also for an entire range of shaft diameters.

The individual spring-actuation of the several blocks also assures a faultless operation.

A still further important advantage of the invention resides in the fact that the clutch of the invention is capable of being used not only, as in customary, for freewheeling structures, for structures to prevent rotation in an undesired direction, and for overrunning clutches and the like, but for a completely wear-free operation of machines components which rotate at high speeds, particularly for the components of gas turbines. The structure of the invention also lends itself to use for reversing drives and clutches in the case where a pair of oppositely rotating clutches of the invention are used.

A still further advantage which is achieved with the clutch of the invention as a result of the relatively small mass of the wedging blocks is that the resulting small spring forces which act on the wedging blocks when they are in their engaged positions does not have any destructive influence on the lubricating film used primarily to suppress vibrations.

The use of circumferential wedging surfaces which are curved according to logarithmic spirals avoids friction during transition between disengaged and engaged positions even where there is a considerable deviation between the shape and size of a wedging block with respect to the circumferential space in which it is accommodated.

The use of an annular spring which will urge the wedging blocks against the inner race makes it possible to maintain a film of lubricant on the outer race because the lubricating medium, instead of slipping at the inner race, is maintained by centrifugal force at the outer race and is not displaced therefrom.

There is also a further advantage in the possibility of using the clutch of the invention with flat races. Such a construction can be used, for example, in the feeding drives of machine tools.

It is furthermore of importance to recognize that each wedging block of the structure of the invention can be stamped in the simplest possible manner together with the hooks for engaging the spring and the pins for engaging the cages from a single plate which is rectangular at all of its surfaces.

BRIEF DESCRIPTION OF DRAWINGS

The invention is illustrated by way of example in the accompanying drawings which form part of this application and in which:

FIG. 1 is a fragmentary schematic illustration of a conventional clutch;

FIG. 2 is a sectional elevation of a wedging block of the invention taken in a radial plane along line 2–2 of FIG. 3 in the direction of the arrows;

FIG. 3 shows the block of FIG. 2 as it appears when looking toward a side surface of the block;

FIG. 4 is a schematic top plan view of the block of FIGS. 2 and 3;

FIG. 5 is a schematic top plan view of another embodiment of a wedging block of the invention as seen when looking toward the axis of the clutch;

FIG. 6 is a schematic representation of an example of a third embodiment of wedging blocks of the invention;

FIG. 7 is a schematic sectional elevation of a fourth embodiment of a wedging block of the invention, FIG. 7 showing the relationship between successive radial sections of the block, such as sections taken along line 7a–7a, 7b–7b of FIG. 8 in the direction of the arrows;

DESCRIPTION OF PREFERRED EMBODIMENTS

Figure 8:
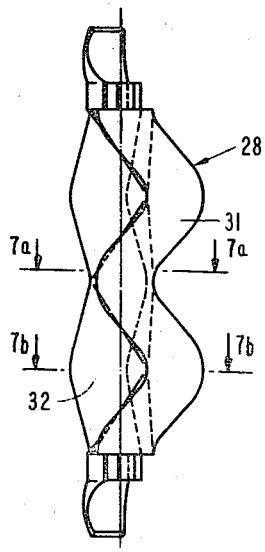
FIG. 8 is a top plan view of the wedging block of FIG. 7 as seen when looking toward the axis of the clutch.

Referring to FIG. 1 of the drawings, there is illustrated therein a conventional clutch structure having wedging blocks 1 and 2 which are shown in perspective and which are situated between an inner race 3 and an outer race 4. The wedging blocks 1 and 2 are composed of primarily prism-shaped bodies and are provided with elongated axially extending end surfaces 5 and 6 which will have wedging engagement with the races and which can roll during a change in the operating conditions between engagement and disengagement on the races 3 and 4. Each of these axially extending end surfaces 5 and 6 can have in a radial section the configuration of an arc of a circle. With this construction the block 1 will have the wedging points 7 and 8 between which a wedging axis 9 extends to determine the wedging plane. Thus, the axis 9 determines with the outer wedging point 7 the wedging angle 11 between the axis 9 and the radius 10.

The side surfaces of blocks 1 and 2 are parallel to the axis 9. It is also apparent from FIG. 1 that the outer relatively small wedging surfaces of the blocks which respectively extend along the lines 12 and 13 parallel to the clutch axis are situated at a relatively great distance 18 from each other, so that only a relatively small number of the wedging blocks can be situated in the circumferential space between the races. The same considerations apply to the axially extending inner wedging areas which extend along the lines 14 and 15.

The wedging block 16 of the invention which is illustrated in FIGS. 2—4 is made from a plate which initially has all of its outer surfaces of a rectangular configuration, such a plate being provided with the illustrated wavy configuration so that when looking toward the axis of the clutch the block 16 will have the configuration illustrated in FIG. 4. The rectangular cross section of the initial plate from which the block is formed, which extends substantially radially in the assembled clutch, is illustrated in section in FIG. 2, this rectangular section being one of a series of such rectangular sections distributed axially of the block and displaced with respect to each other to provide the wavy configuration apparent from FIG. 4. Such wedging blocks, because of their wavy construction, can at least partly nest one within the next between the races so that in this way the extent to which a given circumferential space between a pair of races can be filled with wedging blocks is considerably increased.

It is to be noted, however, that operating conditions can be encountered where the wedging areas 17 and 66, each illustrated by a pair of dot-dash lines in FIG. 4, can be interrupted in a direction parallel to the clutch axis. As of result, there will be provided, as indicated by the shaded surface areas of FIG. 4, the wedging areas 20 for the outer elongated end surface and the wedging areas 19 for the inner elongated end surface of each block, with these areas axially displaced with respect to each other in the manner indicated in FIG. 4 in the manner of a phase shift of a pair of waves. With this construction the distribution of the force will therefore take place along a zigzag line 21, indicated schematically in FIG. 4, so that as a result bending forces will be encountered in the block 16 requiring the latter to have relatively large dimensions so that while certain advantages are achieved with this construction of the invention, nevertheless it does not provide the optimum form and size of a wave-shaped wedging block.

The wave-shaped configuration of the side surface 66a of the block 16 is apparent from FIG. 3, part of the side surface also being illustrated in FIG. 2, and it is to be noted that a radially extending wave recess on one side of the block is in circumferential alignment with an outwardly bulging radially extending wave portion on the other side of the block. In this way the outwardly bulging wave portions of one block can be received in the radial recesses of an adjoining block.

The bending stresses which are encountered with a block of the type shown in FIGS. 2—4 can, however, be avoided by using the structure shown for the wedging block 22 of FIG 5, this block 22 also being provided with waves as was the case with the block 16. However, the waves formed by the opposed axially extending end surfaces which coact with the races are arranged so that the wave formed by the inner end surface which coacts with the inner race is shifted to an extent equal to half a wavelength with respect to the wave formed by the outer axially extending end surface, while the circumferentially extending wave amplitudes and the wave frequency of both waves are equal. In this way the wedging block 22 of FIG. 5 is achieved with a outer axially extending end surface 23, shown in solid lines in FIG. 5, and an inner axially extending end surface 24 shown in dotted lines in FIG. 5. The inner surface 24 will have the wedging areas 25 shown shaded in FIG. 5 while the outer end surface 23 will have the wedging areas 26, also shown shaded in FIG. 5 where the axis 27 of the clutch is also illustrated.

With this construction there will be no bending stresses inasmuch as the wedging areas 25 are respectively in circumferential alignment with the wedging areas 26.

However, it is possible to achieve an even greater increase in the number of blocks of the invention which can be situated in a given circumferential space between the clutch races by providing wedging blocks as shown in FIG. 6 where in any radial section perpendicular or normal to the clutch axis the wedging block has a wedge-shaped configuration of a width which gradually increases from the inner race toward the outer race. In this way the distance 18 of FIG. 6 is much smaller than the corresponding distance 18 of FIG. 1.

A practical embodiment of such a wedging block is shown in FIG. 7 as it appears when viewed in a radial plane which is normal to the clutch axis, FIG. 7 showing in fact a plurality of radial sections of the illustrated block 28 situated one behind the other along an axis parallel to the clutch axis. This wedging block 28 of FIG. 7 is also formed from a plate which initially is of rectangular cross section, having, for example, the cross section 29. The successive axially distributed radial sections 29 of the block 28 are angularly displaced with respect to each other about a twist axis 30 which extends parallel to the clutch axis in such a way as to provide the block with the configuration shown in FIG. 7 when projected onto a plane perpendicular or normal to the clutch axis.

As may be seen from FIG. 8, this wedging block 28 has an outer axially extending end surface 31 and an inner axially extending end surface 32 for respective wedged engagement with the outer and inner races. The wavelengths of both wavy end surfaces are equal, but they are not in phase inasmuch as one of the end surfaces is shifted by half a wavelength with respect to the other end surface. Inasmuch as the twist axis 30, indicated in FIG. 7, is situated beneath the center of the rectangular section, the waves formed by the axially extending end surfaces 31 an 32 will have different amplitudes in a circumferential direction.

Figure 9:
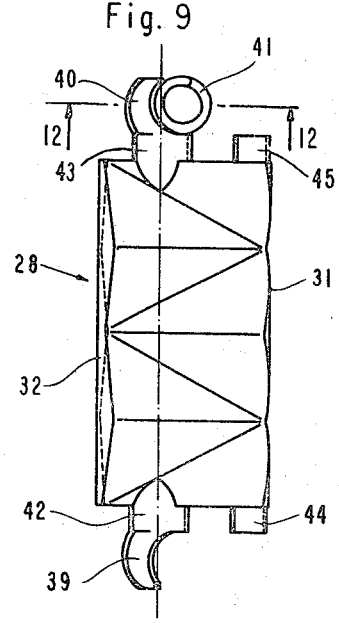
FIG. 9 is a view of the block of FIG. 8 as seen when looking toward a side surface of the block.

The block 28 of FIG. 8 is shown in FIG. 9 as it appears when looking toward a side surface of the block from a plane parallel to or containing the clutch axis. Thus, FIG. 9 also shows the outer axially extending end surface 31 and the inner axially extending end surface 32 which respectively coact with the outer and inner races. The operations which are achieved with this block of the invention are described below.

Figure 10:
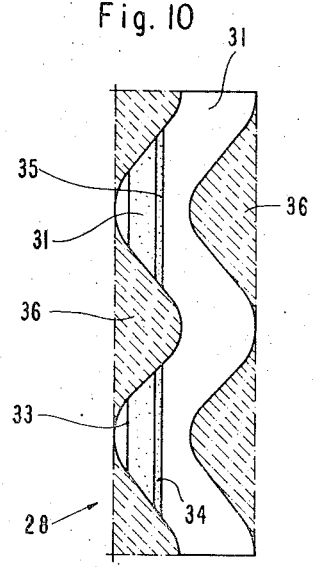
FIG. 10 is a schematic top plan view of the block of FIG. 9 as seen when looking toward the axis of the clutch.

In FIG. 10 the entire wedging region is illustrated by the limiting lines 33 and 34. During full load operation, the effective wedging area 35 is provided. It is apparent, therefore, that the entire wedging area 33, 34 or 35 is interrupted in a direction parallel to the direction of rotation of the clutch. The shaded areas 36 shown in FIG. 10 are indicative of the free spaces provided by the waves of the block, these free spaces making it possible for the successive wedging blocks to have an internested relationship so as to achieve the greatest possible filling of the circumferential space between the races with the wedging blocks.

Figure 11:
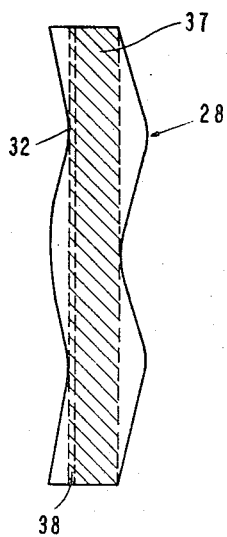
FIG. 11 is a view of the block of FIGS. 8—10 as seen when looking outwardly away from the axis of the clutch radially toward the inner axial end surface of the block.

The fact that the end surface 31 of the block 28 of FIG. 10 has an interrupted wedging engagement is immaterial inasmuch as the inner axially extending end surface 32 (FIG. 11) has such a configuration and size that its wedging region 37 in a direction parallel to the clutch axis has no interruptions. Thus, this construction provides an assurance that under all operating conditions at least one of the axially extending end surfaces of each wedging block, in this case the inner axially extending end surface, has an uninterrupted axially extending wedging area, so that there can be no bending stresses acting on the block 28.

The rolling pressure of the wedging block should be taken into consideration, however, in designing the wedging block. This pressure is greater at the inner wedging surface because the smaller radius for transmitting the turning moment is located at this inner axially extending end surface and further because at the inner axially extending end surface of each block there are a pair of convex surfaces, namely the outer circumferential surface of the inner race 3 and the inner axially extending end surface of the block 28, so that a pair of such convexly curved surfaces coact at this region. If, however, the same wedging areas are provided at the inner and outer end surfaces, no use will be made of the outer wedging surface because the most important consideration for the entire operation is the maximum turning moment transmission. Of course, it is assumed that both races are made of the same material. Use can be made of these factors by forming the waves of the outer axially extending end surfaces of the blocks in such a way that they are sufficiently deep, in a circumferential direction, to increase the extent to which the circumferential space between the races may be filled with blocks, and thus these outer axially extending end surfaces, or their effective wedging areas, are reduced to such an extent that there will be achieved at the outer axially extending end surfaces a rolling pressure equal to that at the inner axially extending end surfaces.

The limiting lines 33 and 34 of FIG. 10 indicate the wedging areas forming the entire effective areas which function to transmit the load during rolling of the blocks into their engaged positions. These areas correspond to the area 37 indicated in FIG. 11. However, the final wedging area at the end of the tilting of the blocks into their fully engaged positions is provided at the area 35 indicated in FIG. 10, corresponding to the area 38 indicated in FIG. 11. Thus, the axially extending end surfaces of the block 28 of FIG. 10 are designed in such a way that the length of the wedging areas as the rolling or tilting of the blocks into their fully engaged positions progresses increase so that these areas increase in size with the increasing load until the full load position is attained. In other words, during progressive rolling or tilting of the blocks from their disengaged to their engaged positions the area of engagement progresses circumferentially from the limiting line 33 to the limiting line 34 of FIG. 10.

The wedging block 28, as shown in FIG. 9, has at its opposed radial end faces a pair of integral hooks 39 and 40 which extend substantially parallel to the clutch axis. They serve to form an operative connection between each block and an annular spring means 41. Thus, the block 28 as shown in FIG. 9, can for example, be constructed in such a way that its axially extending end surface 32 engages the inner race of the unillustrated clutch. In this case the spring means 41 has the form of a tension spring in the form of an endless coil spring. This clutch structure is disengaged by displacement of the outer axially extending end surfaces 31 of the blocks inwardly away form the outer race of the clutch in opposition to the pulling force of the spring 41.

The endless tension spring 41 is dimensioned in such a way that up to the rotary speeds normally encountered during operation the centrifugal force at the blocks 28 is at least balanced and these blocks are pressed against the inner race. Then the following takes place.

The surface of each hook 40 which engages the spring 41 is composed of a pair of differently curved portions 72 and 73, in radial section, in such a way that during disengagement of the clutch the spring 41 rides on the curve 73 of larger radius. As a result the spring force is intensified so that each block, which tilts back through a considerable extent during disengagement, is moved into its engaged position with a force which is greater than the force with which it is brought into the final disengaged position. In the engaged position of the blocks the spring force for the wedging engagement itself is again as great as the required wedging pressure.

It is thus possible to achieve in this highly advantageous and extremely simple manner a construction where the clutch of the invention, even if it has wedging blocks which are retracted through a considerable distance in their disengaged positions, can again immediately assume their engaged positions, so that the frequency with which the clutch can be switched between engaged and disengaged positions is not diminished.

It is of particular advantage to provide blocks and a spring means of such a construction that the wedging blocks, during idling or disengagement of the clutch, remain in engagement with that one of the clutch races which changes its direction of rotation. Thus, with such a construction the blocks will immediately move together with that one of the races which changes direction of rotation and only an extremely short duration is required to switch the clutch from its disengaged to its engaged position inasmuch as the center of gravity of each block has a tendency to maintain it rotating in the same direction in which it was turning before the direction of rotation was changed.

It is however also possible to situate the wedging blocks of the invention in the circumferential space between the races so that the axially extending end surfaces 32 coact with the outer race (see FIG. 9). Thus, with such a construction each block will have a position displaced by 180° with respect to the clutch axis as seen in FIG. 9, so that now the axially extending end surface 31 of each block coacts with the inner race and the surface 32 with the outer race of the clutch. In this case it is possible in the disengaged condition of the clutch to have the wedging blocks displaced from the inner race by forming the spring means 41 as a compression spring instead of a tension spring.

With this latter type of arrangement of the blocks there is almost the same extent of filling of the circumferential space between the races as in the normal position of the blocks where the end surfaces 32 coact with the inner race, because even in the reverse position of the blocks it is possible for them to have the same internesting relationship. The only fact which need be taken into consideration under these conditions is that in the reverse position of the blocks of the clutch of the invention only a smaller turning moment can be transmitted. The reasons for this are as follows:

If the rolling pressure at the inner and outer races is calculated in both cases in such a way that the same turning moment is transmitted, then there will be a lesser rolling pressure at the outer race. The reason for this is primarily that the transmitted turning moment at the outer race, because of the larger radius is greater, and furthermore because at the outer race a convex end surface of each block coacts with a concave surface of the race while at the inner race a pair of convex surfaces coact with each other. Therefore, with the wedging blocks of the invention, particularly when they have the construction shown for the block 28 in FIG. 9, in the normal position the outer axially extending end surface of the block has a wavy configuration reducing the wedging area in such a way that at the outer race there is a wedging pressure whose magnitude is equal to that at the inner race. Of course, it is assumed that in this case the inner and outer races are made of the same material or if they are not made of the same material then the wedging areas have corresponding sizes to provide the same turning moment in both cases.

In other words, with the wedging block 28 the axially extending end surface 31 which will normally coact with the outer race will be made smaller in correspondence with the rolling pressure difference between the inner and outer races. Thus, when such a wedging block has its position reversed so that the larger axially extending end surface is directed toward the inner race, the smaller wedging area will be provided at the inner race where because of the smaller radius and the less favorable coaction of a pair of convex surfaces there will be a higher rolling pressure. Therefore, if the design of the block of the invention is not changed and the block is reversed only a smaller turning moment can be transmitted.

Therefore, by making use either of an annular tension spring means or an annular compression spring means and by providing a corresponding positioning of the wedging blocks it is possible to provide a clutch where the blocks will remain permanently in engagement with either one of the races, depending upon which one changes its direction of rotation, while being movable toward and away from that one of the races which is to be driven in only one direction of rotation.

Figure 13:
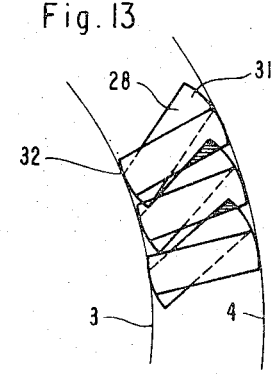
FIG. 13 is a schematic representation of the manner in which the series of circumferentially distributed blocks of the invention coact with each other, FIG. 13 being taken in a plane which is normal to the axis of the clutch.
Figure 14:
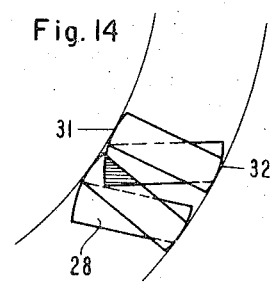
FIG. 14 shows a structure identical with that of FIG. 13 except that the wedging blocks are in a position which is reversed with respect to that of FIG. 13.

FIGS. 13 and 14 illustrate how the blocks 28 can have an internesting relationship with respect to each other between the races 3 and 4. In FIG. 13 the blocks 28 are shown in their normal position where the greatest possible turning moment can be transmitted, and in this normal position the axially extending end surfaces 31 of longer circumferential curvature coact with the outer race. It is apparent from FIGS. 13 and 14 that the successive blocks are capable of nesting one into the next in the region of the inner race 3 as well as in the region of the outer race 4 as a result of the wavy configuration of the blocks.

FIG. 14 shows the blocks in a position reversed with respect to their position in FIG. 13. In FIG. 14 the manner in which the blocks internest is also illustrated, while with the arrangement of FIG. 14 the turning moment which can be transmitted is smaller because of the lesser extent to which this circumferential space can be filled with blocks and the less favorable surface stresses, as compared with the arrangement of FIG. 13.

As may be seen from FIG. 9, the hooks 39 and 40 are situated at the outer ends of pins 42 and 43, respectively, situated between the hooks and the radial end faces of the blocks. These pins extend through openings of an unillustrated cage means, and the latter openings provide sufficient play so that the required tilting or rolling movements of the blocks between their engaged and disengaged positions will be provided.

Figure 12:
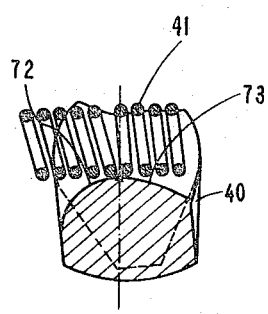
FIG. 12 is a fragmentary transverse section, taken along line 12–12 of FIG. 9 in the direction of the arrows, showing details of a hook of the block of FIGS. 8—11.
Figure 15:
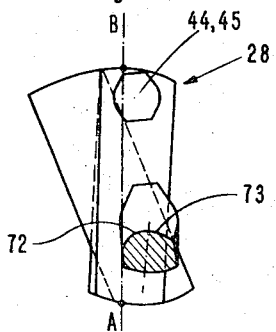
FIG. 15 shows the wedging block in the manner in which it is illustrated in FIG. 7 but with additional details.

Holding pins 44 and 45 similar to the holding pins 42 and 43 are also respectively connected to the opposed radial end faces of each block. These additional holding pins 44 and 45 are also received in an unillustrated cage which is different from the cage which receives the pins 42 and 43. Both cages are circumferentially displaceable with respect to each other in opposed directions. In order to achieve the proper rotary movement in the opposed directions of both cages and to achieve the force changes resulting from the curves 72 and 73 of the hooks, as illustrated in FIG. 12, the center points of the holding pins 44, 45 and the cross section of the hooks 39 and 40 of FIG. 9 are arranged in the manner illustrated in FIG. 15 beside the wedging axis AB displaced upwardly toward the higher or outer part of the wedging block.

One embodiment of a clutch according to the invention is constructed in such a way that the wedging blocks are pressed by means of the tension spring 41 against the inner race 3 even when the blocks are in their disengaged positions, so that the spring 41 has the purpose of at least equaling the centrifugal force acting on the wedging blocks during rotary movement of the clutch in its disengaged position. This expedient, however, will not prevent, with certain clutches and certain operating conditions, the outer end surfaces of the blocks from engaging the outer race in the disengaged clutch position so as to provide wear at the outer race.

Figure 18:
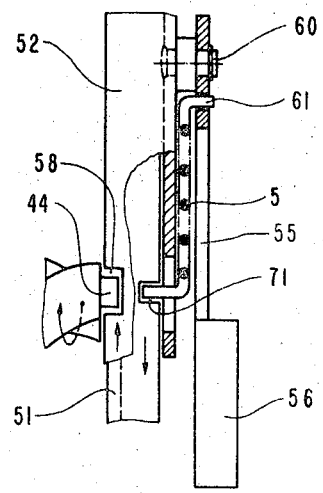
FIG. 18 is a fragmentary partly sectional top plan view of the structure of FIGS. 16 and 17 as seen when looking toward the clutch axis.
Figure 16:
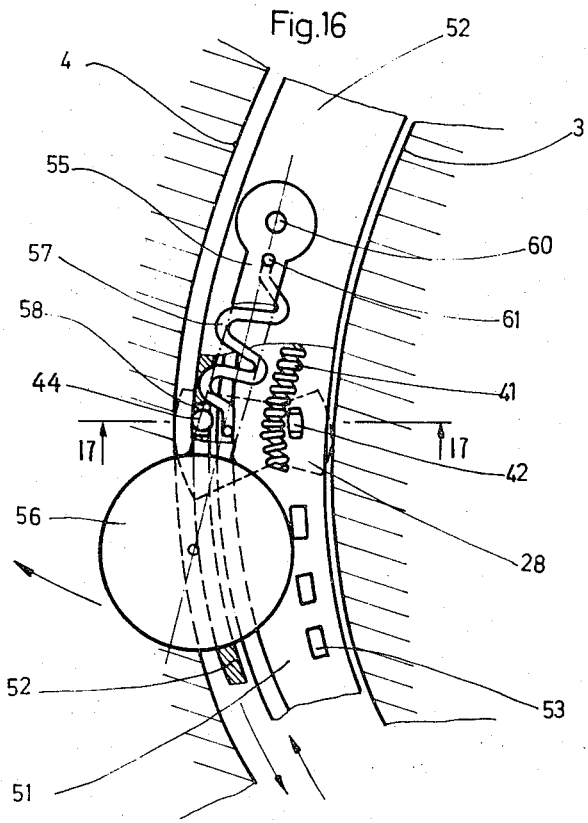
FIG. 16 illustrates partly in section a centrifugal force device seen in a plane normal to the clutch axis.
Figure 17:
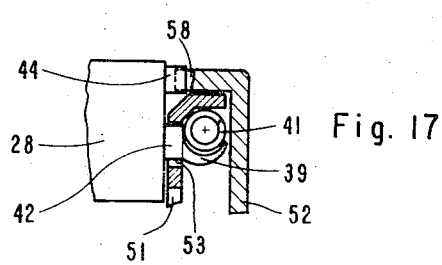
FIG. 17 is a fragmentary sectional elevation of part of the structure of FIG. 16 taken along line 17–17 of FIG. 16 in the direction of the arrows in a plane which contains the clutch axis, the races of FIG. 16 being omitted from FIG. 17 for the sake of clarity.

In order to avoid such wear in the disengaged position, the centrifugal force device of FIGS. 16—18 is provided. FIGS. 16—18 show the pair of cages 51 and 52 which are circumferentially turnable in opposed directions with respect to each other. For those components which have been described above, such as the blocks, spring means, and the like, the same reference characters are used.

The pair of cage means 51 and 52 are arranged one behind the other along the axis of the clutch, as is particularly apparent from FIG. 16 where the cage 52 is illustrated in front and the cage 51 is illustrated behind the cage 52. This outer cage 52 is formed with openings 58 in the form of notches which receive the holding pins 44 of the blocks 28, while the cage 51 is formed with openings 53 to receive the holding pins 42 (FIG. 16).

Both cages are shown in section in FIG. 17 from where it is apparent that they have in a radial section an L-shaped configuration. The centrifugal means includes a lever arm 55 swingably connected by a pivot 60 to the cage 52. This centrifugal means includes a flyweight 56 situated at the free end of the lever 55. The weight 56 can be mounted for shifting movement along the lever 55 so that its position thereon can be adjusted, and of course the weight 56 can be fixed in its adjusted position along the lever 55.

Furthermore, the pair of cages are interconnected by a spring means which includes the tension spring 57 connected at 61 to the lever arm 55 while the opposed free end of the spring 61 is received in an opening 71 of the cage 51.

Referring now to FIG. 16, if the flyweight 56 under the influence of centrifugal force is swung outwardly, then the spring 57 will displace the point 61 and thus also the cage 52 toward the opening 71 of the cage 51 circumferentially of the clutch, so that the blocks 28 will be tilted toward the clutch axis to be displaced from the outer race 4. Thus, each block is displaced through its pin 44 which, as it particularly apparent from FIGS. 16 and 17 is received in the opening or notch 58 of the outer cage 52.

All of the arrows shown in FIG. 16 correspond therefore to the outward movement of the flyweight 56 which is also indicated by an arrow in FIG. 16.

The tension spring 57 and the lever arm 55 are arranged in such a way and are dimensioned in such a way that, as shown in FIG. 16, they extend one beside the other in the same directions when there is no centrifugal force acting upon the weight 56.

Inasmuch as all inaccuracies in the structure resulting from tolerances, eccentricities, and elastic deformations, influence the positions of the wedging blocks when the clutch is engaged, it is necessary to provide for the holding pins of the wedging blocks opening in the cages which are sufficiently great so that under all operating conditions the required tilting movement of the blocks 28 can be carried out without any interference.

The tension spring 57 is designed in such a way that the necessary pulling force is achieved without practically any stretching of the spring. However, the structure must also be designed in such a way that in the reverse case upon loading of the clutch and rolling of the wedging surfaces into wedging engagement the pulling of the cages 51 and 52 takes place in the reverse direction. The forces encountered at this time stretch the spring to a corresponding extent. The engagement point of the spring 57 at the lever 55 is selected in such a way that with extremely small flyweights 56 there are nevertheless sufficiently great pulling forces at the cages 51 and 52.

The arrangement of the spring 57 and lever arm 55 so that they extend parallel to each other provide the advantage that the pulling component in the extended position is greatest and that with this construction the centrifugal lever 55 can also be mechanically actuated. This provides the possibility of selectively disengaging the clutch. It is, however, immaterial whether the lever 55 is pulled outwardly or inwardly.

Figure 19:
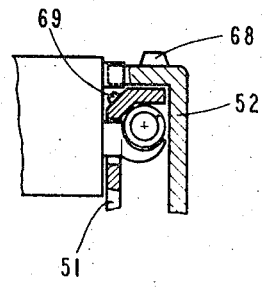
FIG. 19 is a view similar to FIG. 17 of another embodiment of cage means used with the clutch of the invention.

The structure illustrated in FIG. 19 corresponds primarily to that of FIG. 17 and also has the pair of cages 51 and 52 which are circumferentially displaceable in opposed directions with respect to each other. In this case, however, the adjustment or movement of the cages with respect to each other is brought about by way of turbine blades 68 and 69 which are carried by the cages at their outer peripheral portions. Oil under pressure can act on these turbine blades to bring about the required positioning of the cages with respect to each other.

In the event that the center of gravity of each wedging block, the pressure of the spring 41 and the engaging point of the spring 41 are all selected in such a way that with normally encountered tolerances the engaging or disengaging components remain within very narrow limits, which is to say at a value less than that of the spring force, it is possible to achieve a control of the movement of the wedging blocks by way of the oil pressure in a fully automatic manner in such a way that at different speeds of revolution of the clutch the latter operates without wear but on the other hand will become engaged when one of the races overtakes the other races and achieves a synchronous rotary movement with respect thereto so that speed surges resulting from delayed coupling cannot occur.

Figure 20:
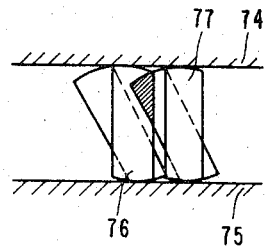
FIG. 20 is a schematic illustration of an embodiment of the invention which has flat races.

It has been mentioned above, the clutch of the invention can be used with flat races. Such constructions are of use, for example, in the feeding drives of machine tools. A structure of this latter type is fragmentarily illustrated in a schematic manner in FIG. 20. Referring to FIG. 20 it will be seen that there are a pair of flat, parallel races 74 and 75, of the type used, for example, for the feeding mechanisms of machine tools. These races can either be movable one with respect to the other in opposed directions, or one of the races can be stationary while the other is movable. Between these races a pair of the wedging blocks 76 and 77 of the present invention are illustrated, and the operation of these blocks is precisely the same as described above in connection with ring-shaped races.

I claim:

1. In a one-way engaging clutch, a pair of races including an inner race having an outer surface and an outer race having an inner surface, said surfaces being equidistantly spaced from each other, and a plurality of tiltable wedging blocks situated between said races for engaging said surfaces thereof, each block being formed at one side with a radially extending recess and at its opposite side with an outwardly bulging projection circumferentially aligned with said recess, and said blocks nesting at least partly into each other with the outwardly bulging projections of said blocks respectively extending into the recesses of adjoining blocks, each block having at least one axially extending end surface of wavy configuration.

2. In a one-way engaging clutch, an inner race having an outer circumferential surface, an outer race having an inner circumferential surface coaxially surrounding and spaced from said outer circumferential surface, and a plurality of tiltable wedging blocks situated between said races for engaging said surfaces thereof, each block being formed at one side with a radially extending recess and at its opposite side with an outwardly bulging projection circumferentially aligned with said recess, and said blocks nesting at least partly into each other with the outwardly bulging projections of said blocks respectively extending into the recesses of adjoining blocks, each block having at least one axially extending end surface of wavy configuration.

3. The combination of claim 2 and wherein each block has at least one circumferentially extending wave portion providing said block on one side with said recess and on its opposite side with said outwardly bulging portion.

4. The combination of claim 3 and wherein each block has opposed axially extending end surfaces for respectively engaging said circumferential surfaces of said races, and both of said end surfaces of each block being of a wavy configuration.

5. The combination of claim 4 and wherein the pair of opposed axially extending end surfaces of each block which are both of wavy configuration respectively have equal wave amplitudes.

6. The combination of claim 4 and wherein the pair of opposed axially extending end surfaces of each block which are both of wavy configuration respectively have unequal wave amplitudes.

7. The combination of claim 4 and wherein the pair of opposed axially extending end surfaces of each block both of which are of wavy configuration respectively have equal wavelengths.

8. The combination of claim 4 and wherein the pair of opposed axially extending end surfaces of each block of which both are of wavy configuration respectively have unequal wavelengths.

9. The combination of claim 4 and wherein the pair of opposed axially extending end surfaces both of which are of wavy configuration respectively form parts of waves which are in phase.

10. The combination of claim 4 and wherein the pair of opposed axially extending end surfaces of each block both of which are of wavy configuration respectively form parts of waves which are out of phase.

11. The combination of claim 10 and wherein one of the waves formed by one of said axially extending end surfaces is out of phase with the wave formed by the other of said axially extending end surfaces by an extent equal to one half a wavelength.

12. The combination of claim 2 and wherein each block has in a plane normal to the common axis of said races a radial section of wedge-shaped configuration which diverges from said inner race toward said outer race.

13. The combination of claim 2 and wherein each block is composed of a plurality of radial section axially distributed along each block and said plurality of radial sections of each block respectively having longer sides extending substantially radially along side surfaces of each block and shorter sides extending substantially circumferentially along opposed end surfaces of each block, and said radial sections of each block being angularly displaced with respect to each other in opposed circumferential directions to provide each block with opposed side surfaces of wavy configuration.

14. The combination of claim 13 and wherein said radial sections of each block are angularly displaced with respect to each other about a twist axis which extends parallel to the common axis of said races.

15. The combination of claim 14 and wherein said twist axis is situated midway between the longer, substantially radially extending sides of each rectangular section and approximately one third of the distance from said inner race to said outer race.

16. The combination of claim 15 and wherein the extent of angular displacement of said radial sections of each block with respect to said twist axis provides each block when projected onto a plane normal to the common axis of said races with a wedge-shaped configuration of gradually increasing width from said inner toward said outer race.

17. The combination of claim 4 and wherein each block has, at the pair of opposed axially extending end surfaces thereof both of which are of wavy configuration, wedging surfaces which have at said outer circumferential surface of said inner race an axially extending wedging area which is uninterrupted and at said inner circumferential surface of said outer race an interrupted axially extending wedging area.

18. The combination of claim 2 and wherein each block has a pair of opposed axially extending end surfaces for pressing against said circumferential surfaces of said races, respectively, over wedging areas providing equal rolling pressures at said pair of opposed axially extending end surfaces of each block.

19. The combination of claim 2 and wherein each wedging block has a pair of opposed axially extending end surfaces respectively having a rolling, wedging engagement with said circumferential surfaces of said races, and said end surfaces of each block having in a radial plane normal to the common axis of said races the configuration of a logarithmic spiral.

20. The combination of claim 2 and wherein each block has a pair of opposed axially extending end surfaces for wedging engagement with said circumferential surfaces of said races, respectively, and said end surfaces of each block having wavy configurations respectively providing said end surfaces of each block with waves of equal lengths but different amplitudes and with the waves formed by said end surfaces of each block being out of phase with respect to each other by one half a wavelength.

21. The combination of claim 2 and wherein each block has a pair of opposed axially extending end surfaces respectively coacting with said circumferential surfaces of said races for wedging engagement therewith, and said end surfaces of each block respectively having a wavy configuration forming parts of waves of different amplitudes, and the end surface of each block which coacts with the outer circumferential surface of said inner race having a wave amplitude which is smaller than the wave amplitude of the outer end surface of each block which coacts with the inner circumferential surface of said outer race.

22. The combination of claim 2 and wherein each block has a pair of opposed axially extending end surfaces coacting with said circumferential surfaces for wedging engagement therewith, respectively, and said end surfaces of each block respectively having wavy configurations forming parts of waves of different amplitudes, and that end surface which is of smaller amplitude forming the outer end surface of each block which coacts with the inner circumferential surface of said outer race.

23. The combination of claim 2 and wherein each wedging block terminates in a pair of opposed radial end faces, at least one hook fixed to each block at one of said radial end faces thereof, and an annular spring engagement said hook of each block.

24. The combination of claim 23 and wherein said spring is a tension spring.

25. The combination of claim 23 and wherein said spring is a compression spring.

26. The combination of claim 23 and wherein each hook has in engagement with said spring an outwardly directed convexly curved surface made up in a radial plane normal to the common axis of said races of a pair of arcs of different radii, respectively, with the arc of greater radius situated at a greater distance from said common axis than the arc of smaller radius.

27. The combination of claim 2 and wherein each block terminates in a pair of opposed radial end faces, a pair of cage means respectively situated adjacent said faces and formed with a pair of openings in the region of said outer circumferential surface of said inner race, respectively, and a pair of holding pins respectively fixed to each block at said radial end faces thereof and extending into said openings of said pair of cage means.

28. The combination of claim 27 and wherein at least one additional cage means is situated adjacent one of said end faces of each block and is formed in the region of the inner circumferential surface of said outer race with a cutout, and an additional pin carried by each block at said one end face thereof and received in said cutout of said additional cage means.

29. The combination of claim 28 and wherein said additional cage means and said pair of cage means are circumferentially displaceable one with respect to the other.

30. The combination of claim 29 and wherein a spring means extends between and interconnects said additional cage means and that one of said pair of cage means which is adjacent said additional cage means at said one end face of each block, and a flyweight operatively connected to said spring means for controlling the latter.

31. The combination of claim 30 and wherein said flyweight includes a lever arm having an outer free end where a weight is located, said lever arm being swingably connected distant from said outer free end thereof to said additional cage means.

32. The combination of claim 31 and wherein said spring means and lever arm extend parallel to each other when there is no centrifugal force acting on said flyweight.

33. The combination of claim 32 and wherein said spring means is connected with said lever arm at a location providing a relatively large pulling force on said additional cage means and said one cage means adjacent thereto even when said weight at said free end of said lever arm is of relatively small magnitude.

34. The combination of claim 33 and wherein said spring means and flyweight coact with each other to provide on each block a turning moment tending to displace each block out of engagement with the inner circumferential surface of said outer race due to centrifugal force acting on said flyweight.

35. The combination of claim 2 and wherein each block has a pair of opposed radial end faces, a pair of cage means coacting with each block at the region of at least one of said end faces for tilting each block, said pair of cage means respectively being circumferentially displaceable one with respect to the other and each block respectively having at its one end face projections while said pair of cage means are respectively formed with cutouts receiving said projections for controlling tilting of each block during circumferential displacement of said pair of cage means one with respect to the other, and said pair of cage means respectively carrying oppositely directed turbine blades for coacting with a fluid.

36. The combination of claim 35 and wherein said fluid is an oil under pressure coacting with said pair of cage means for automatically controlling the latter, and the pressure of the oil having a magnitude determined by the differential speed between said races.

37. The combination of claim 2 and wherein a cage means coacts with each wedging block at the region of said outer circumferential surface of said inner race to support each block for tilting movement, and each block having in the region of said inner circumferential surface of said outer race a blade-shaped configuration for coacting with oil under pressure to determine the operating position of each block.

38. The combination of claim 2 and wherein each block has in radial planes normal to the common axis of said races and distributed axially along each block a plurality of radial sections each having a pair of opposed relatively long sides extending substantially radially between said circumferential surfaces and a pair of opposed small sides extending substantially circumferentially about said common axis of said races and forming parts of a pair of opposed axially extending wedging end surfaces of each block, said plurality of axially distributed radial sections of each block being angularly displaced with respect to each other about a twist axis extending through each block parallel to the common axis of said races, midway between the long substantially radial sides of each rectangular section and situated one third of the distance between said outer circumferential surface of said inner race and said inner circumferential surface of said outer race, the angular displacement of said radial sections with respect to said twist axis providing said opposed axially extending end surfaces of each block with wavy configurations respectively having the same wave length but out of phase with respect to each other by an extent equal to one half a wavelength, said radial sections of each block being angularly displaced about said twist axis in opposed circumferential directions and providing said block when projected onto a radial plane normal to said common axis of said races with a wedge-shaped configuration of gradually increasing width from said inner toward said outer race.

39. The combination of claim 2 and wherein one of said races turns in opposed directions about the common axis of said races, and said wedging blocks having disengaged positions where they do not transmit rotary movement between said races, said wedging blocks in said disengaged positions thereof remaining in engagement with that one of said races which turns in opposed directions.

40. The combination of claim 1 and wherein said races are flat and parallel to each other.